(12) United States Patent
Andersson et al.

(10) Patent No.: US 9,111,392 B2
(45) Date of Patent: Aug. 18, 2015

(54) STOCHASTIC DEPTH BUFFER COMPRESSION USING GENERALIZED PLANE ENCODING

(71) Applicant: Intel Corporation, Santa Clara, CA (US)

(72) Inventors: Magnus Andersson, Helsingborg (SE); Carl J. Munkberg, Malmo (SE); Tomas G. Akenine-Moller, Lund (SE); Jon N. Hasselgren, Bunkeflostrand (SE)

(73) Assignee: Intel Corporation, Santa Clara, CA (US)

( * ) Notice: Subject to any disclaimer, the term of this patent is extended or adjusted under 35 U.S.C. 154(b) by 196 days.

(21) Appl. No.: 13/721,163

(22) Filed: Dec. 20, 2012

(65) Prior Publication Data

US 2014/0085300 A1    Mar. 27, 2014

Related U.S. Application Data

(60) Provisional application No. 61/706,177, filed on Sep. 27, 2012.

(51) Int. Cl.
*G06T 11/40* (2006.01)
*G06T 9/00* (2006.01)
*G06T 15/40* (2011.01)

(52) U.S. Cl.
CPC . *G06T 11/40* (2013.01); *G06T 9/00* (2013.01); *G06T 15/40* (2013.01)

(58) Field of Classification Search
CPC ....... G06T 15/405; G06T 15/20; G06T 11/40; G06T 15/40; G06T 9/00
USPC .................. 345/422, 423, 643, 644
See application file for complete search history.

(56) References Cited

U.S. PATENT DOCUMENTS

| | | |
|---|---|---|
| 6,956,576 B1 | 10/2005 | Deering |
| 8,089,486 B2 | 1/2012 | Anderson |
| 2012/0212489 A1 | 8/2012 | Fisk |

OTHER PUBLICATIONS

Munkberg et al. "Hierarchical Stochastic Motion Blur Rasterization", HPG 2011, Vancouver, British Columbia, Canada, Aug. 5-7, 2011; 2011 ACM 978-1-4503-0896-0/11/0008.*
Andersson, M., et al., "Depth Buffer Compression for Stochastic Motion Blur Rasterization," In Proceedings of the ACM SIGGRAPH Symposium on High Performance Graphics, Aug. 2011, pp. 127-134.
Gribel, C. J., et al., Analytical Motion Blur Rasterization with Compression. In Proceedings of the Conference on High Performance Graphics, (Jun. 2010) (pp. 163-172). Eurographics Association.

(Continued)

*Primary Examiner* — Maurice L McDowell, Jr.
(74) *Attorney, Agent, or Firm* — Trop, Pruner & Hu, P.C.

(57) ABSTRACT

Unlike a static primitive, where the depth function is planar, the depth function for a moving and defocused triangle is a rational function in time and the lens parameters. Compact depth functions can be used to design an efficient depth buffer compressor/decompressor, which significantly lowers total depth buffer bandwidth usage. In addition, this compressor/decompressor is substantially simpler in the number of operations needed to execute, which makes it more amenable for hardware implementation than previous methods.

30 Claims, 4 Drawing Sheets

(56) References Cited

OTHER PUBLICATIONS

Hasselgren, J., et al., "Efficient Depth Buffer Compression", In SIGGRAPH/EUROGRAPHICS Conference on Graphics Hardware: Proceedings of the 21 st ACM SIGGRAPH/Eurographics symposium on Graphics hardware: Vienna, Austria, (Sep. 2006), (vol. 3, No. 04, pp. 103-110).

PCT International Search Report and Written Opinion issued in corresponding PCT/US2013/048034 dated Jan. 29, 2014, (11 pages).

Gribel, Carl J., et al., "Analytical Motion Blur Rasterization with Compression," In Proceeding HPG, '10 Proceedings of the Conference on High Performance Graphics, Switzerland: Eurographics Assocaition Aire-la-Ville, 2010, pp. 163-172 (10 pages).

Hasselgren, Jon, et al, "Efficient Depth Buffer Compression" In Proceeding GH '06 Proceedings of the 21st ACM SIGGRAPH/EUROGRAPHICS Symposium on Graphics Hardware. USA: ACM New York, NY 2006, pp. 103-110 (8 pages).

* cited by examiner

STOCHASTIC DEPTH BUFFER COMPRESSION USING GENERALIZED PLANE ENCODING

CROSS-REFERENCE TO RELATED APPLICATION

This application claims priority to provisional application Ser. No. 61/706,177 filed Sep. 27, 2012 hereby expressly incorporated by reference herein.

BACKGROUND

Depth buffering is the standard technique to resolve visibility between objects in a rasterization pipeline. A depth buffer holds a depth value for each sample, representing the current closest depth of all previously rendered triangles overlapping the sample. The depth value, d, can be defined in a number of ways.

In a stochastic rasterizer with many samples per pixel, the depth buffer bandwidth requirements are much higher than usual, and the depth data should be compressed if possible. Most depth buffer compression schemes exploit the fact that the depth values from a triangle can be represented by a plane. Unfortunately, for moving and defocused triangles, this is no longer true.

In a static (2D) rasterizer, the depth function can be expressed as a plane. This is exploited by many depth compression schemes. Plane encoding is different from other algorithms because it exploits information coming directly from the rasterizer, and therefore uses the exact same plane equation representation in the compressor as in the rasterizer. The depth information is stored as a set of planes and a per-sample plane selection mask for each tile. When there are few triangles overlapping a tile, storing the plane equations and selection masks is more compact than simply storing the per-sample depth. However, when too many triangles overlap a tile, the storage cost of multiple depth planes is higher than directly storing the per-sample depth values. For each tile, depth compression may then be disabled, or another compression algorithm applied (which usually cannot compress as well as plane encoding).

While plane encoding is very useful for static, two-dimensional rasterization, it does not suffice to use static planes for higher order rasterization, where the depth function is more complex.

BRIEF DESCRIPTION OF THE DRAWINGS

Some embodiments are described with respect to the following figures.

DETAILED DESCRIPTION

Figure 1:
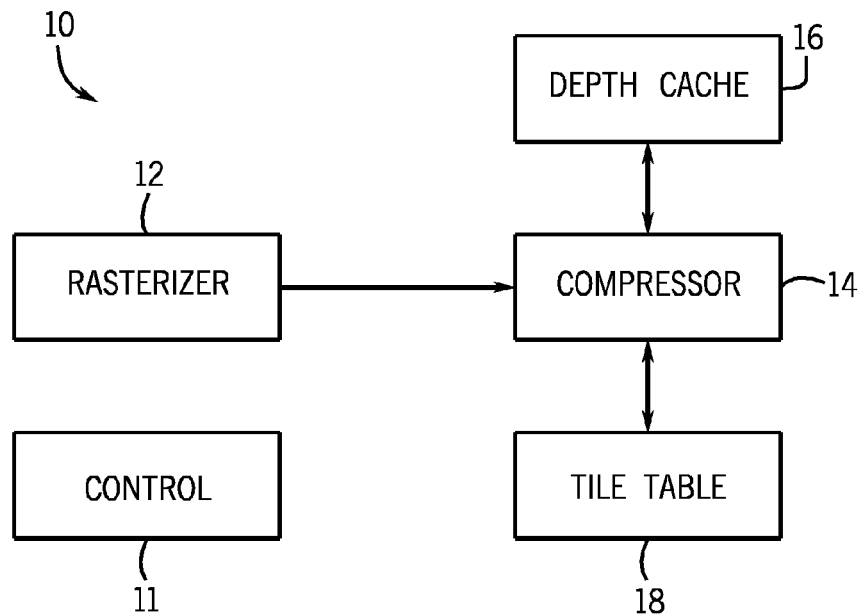
FIG. 1 is a schematic depiction for one embodiment.

Plane encoding may be generalized to include stochastic effects, such as motion blur and depth of field. The depth function coefficients are computed in the rasterizer and are passed to the compressor. A standard plane encoding uses three coefficients per depth function (i.e., a plane) on the form d=A*x+B*Y+C, to represent the depth of a triangle. When the triangle undergoes stochastic effects such as motion blur and depth of field, the depth function is no longer a plane. However, we can still derive a depth function on the form d=f(x, y, u, v, t) by storing more coefficients per triangle.

The benefits of this method include, in some embodiments, a compression algorithm that is substantially more efficient than previous methods. This is made possible by providing an analytical representation of the depth function directly from the rasterizer setup, avoiding the cost of finding a lower order representation in the compressor, as in previous methods. Unlike previous plane compression methods, this method is well suited for motion blur and depth of field effects, and does not break down for these cases. Furthermore, since this method operates on an analytical representation, it may work equally well for floating point precision depth buffers in some embodiments.

The mathematical expression for the depth functions may be analyzed in the case of motion blur and depth of field. Although the expressions may appear somewhat complicated, they can be effectively simplified, and compact forms for the depth functions can be used to design algorithms with substantially better average compression ratios for stochastic rasterization.

In general, the compressors and decompressors exist in a depth system. Compression/decompression is applied to a tile, which typically is the set of depth samples inside a rectangular screen-space region.

Suppose we have a triangle with clip space vertex positions $p_k=(p_{k_x}, p_{k_y}, p_{k_w})$, $k \in \{0,1,2\}$. In homogeneous rasterization, the two-dimensional homogeneous (2DH) edge equation, $e_k = n_k \cdot x$, corresponds to a distance calculation of an image plane position, $x=(x, y, 1)$, and the edge plane, which passes through the origin, with, for example, $n_2 = p_0 \times p_1$.

An arbitrary per-vertex attribute, $A_k$, may be interpolated over the triangle. Each of the barycentric coordinates, $B_0$, $B_1$, $B_2$, of the triangle can be found by evaluating and normalizing the corresponding 2DH edge equation, such that $$B_k = \frac{e_k}{e_0 + e_1 + e_2}.$$

The interpolated attribute, A, for a given sample point, x, can then be found by standard barycentric interpolation:

$$A(x, y) = \sum A_k B_k = \frac{A_0 e_0 + A_1 e_1 + A_2 e_2}{e_0 + e_1 + e_2} \qquad (1)$$

The depth value, d, is formed by interpolating z and w individually, and then performing a division:

$$d(x, y) = \frac{z(x, y)}{w(x, y)} = \frac{\sum z_k B_k}{\sum w_k B_k} = \frac{\sum z_k e_k}{\sum w_k e_k} \qquad (2)$$

If we look at the denominator, we see that:

$$\sum w_k e_k = \left(\sum w_k p_i \times p_j\right) \cdot x \qquad (3)$$
$$= (0, 0, \det(p_k, p_i, p_j)) \cdot (x, y, 1)$$
$$= \det(p_k, p_i, p_j),$$

which is independent of (x, y). This is six times the signed volume of the tetrahedron spanned by the origin and the triangle, which can be used to detect if a triangle is backfacing.

If we use a standard protection matrix, such that the transformation of $(z_{cam},1)$ to clip space (z,w) can be expressed as (c.f., the standard Direct3D projection matrix):

$$z=az_{cam}+b, \quad w=z_{cam}, \qquad (4)$$

then the depth function can be simplified. The coefficients a and b depend solely on $z_{near}$ and $z_{far}$. Combining Equations 2 and 4 and simplifying gives us:

$$d(x,y) = \frac{z(x,y)}{w(x,y)} = a + \frac{b\sum e_k}{\sum w_k e_k} \qquad (5)$$

We have now derived the 2D depth function, which is widely used in rendering systems today. However, Equation 5 can be augmented so that it holds for depth sampled in higher dimensions. For example, adding motion blur and depth of field means that z, w, and the edge equations are functions of shutter time, t, and lens position, (u, v). Thus we can write the depth function on a more general form:

$$d(x,y,\ldots) = a + \frac{b\sum e_k(x,y,\ldots)}{\sum w_k(x,y,\ldots)e_k(x,y,\ldots)}, \qquad (6)$$

where . . . should be replaced with the new, augmented, dimensions.

For higher-order rasterization, including motion blur and defocus blur, static plane equations are not suitable to represent the depth functions, because the depth functions are much more complex in those cases. For motion blur, the depth function is a cubic rational polynomial, for example. Therefore, the plane encoding method is generalized in order to also handle motion blur and defocus blur.

The generalized plane encoding (GPE) algorithm is nearly identical to static plane encoding, except that the plane equations for motion blurred and/or defocused plane equations use more storage, and that the depth functions are more expensive to evaluate. This can be seen in Equation 6, which is based on more complicated edge equations, $e_k$, and $w_k$-components. However, the required number of coefficients for specific cases can be substantially reduced, which makes it possible to fit more planes in the compressed representation. This in turn makes for higher compression ratios and faster depth evaluation.

Similar to static plane encoding, the compression representation for generalized depth (motion and defocus blur, for example) includes a variable number of generalized plane equations, and a plane selector bitmask per sample. If there are at most n plane equations in the compressed representation, then each sample needs [log n] bits for the plane selector bitmask. Next, we simplify the depth functions for higher-order rasterization.

We begin the depth function derivation for motion blur by setting up time-dependent attribute interpolation on matrix form. Then, we move on to reducing the number of coefficients needed to exactly represent the interpolated depth of a triangle.

One approach to store the depth functions for a motion blurred triangle is to retain all vertex positions at t=0 and t=1, which are comprised of a total of 4×3×2=24 coordinate values (e.g., floating-point). If the projection matrix is known, and can be stored globally, then only 3×3×2=18 coordinate values are needed, as z then can be derived from w, using Equation 4, for example. In the discussion below, we show how the depth function can be rewritten and simplified to contain only 13 values, which enables more efficient storage.

In the derivation below, we assume that vertices move linearly in clip space within each frame. Thus, the vertex position, $p_k$, becomes a function of time:

$$p_k(t)=q_k+td_k, \qquad (7)$$

where $d_k$ is the corresponding motion vector for vertex k. Since the vertices depend on time, the 2DH edge equations form 2nd degree polynomials in t:

$$e_k(x,y,t)=(p_i(t)\times p_j(t))\cdot x=(f_k t^2+g_k t+h_k)\cdot x, \qquad (8)$$

where $$h_k=q_i\times q_j, \quad g_k=q_i\times d_j+d_i\times q_j, \quad f_k=d_i\times d_j. \qquad (9)$$

For convenience, we rewrite the edge equation on matrix form:

$$e_k(x,y,t) = t_2 C_k x^T, \qquad (10)$$

where $$C_k = \begin{pmatrix} -h_k- \\ -g_k- \\ -f_g- \end{pmatrix},$$

and $t_2=(1, t, t^2)$, $x=(x, y, 1)$, and $C_k$ is a 3×3 matrix as shown above.

By combining the matrix notation and Equation 1, we have a general expression of how to interpolate a vertex attribute, $A_k$, over a motion blurred triangle:

$$A(x,y,t) = \frac{t_2\left(\sum A_k C_k\right)x^T}{t_2\sum C_k x^T}. \qquad (11)$$

However, if the attribute itself varies with t, e.g., $A_k(t)= A_k^0+tA_k^d$ we obtain a general expression for interpolating a time-dependent attribute over the triangle, with an numerator of cubic degree:

$$A(x,y,t) = \frac{t_2\left(\sum (A_k^0+tA_k^d)C_k\right)x^T}{t_2\sum C_k x^T} = \frac{tC_A x^T}{t_2\sum C_k x^T} \qquad (12)$$

where $t=(1, t, t^2, t^3)$, and the vertex attributes, $A_k$, are multiplied with each $C_k$ and summed to form the 4×3 coefficient matrix $C_A$. This form may be used to interpolate the $w_{clip}$ attribute at the pixel center.

To compute the depth function $$d = \frac{z}{w},$$

we perform barycentric interpolation of the z- and w-components of the clip space vertex positions, which are now linear functions of t, e.g., $z(t)=q_z+td_z$ and $w(t)=q_w+td_w$.

Let us consider the depth function, $d(x,y,t)$:

$$d(x, y, t) = \frac{z(x, y, t)}{w(x, y, t)} = \frac{t_2\left(\sum (q_{k_z} + td_{k_z})C_k\right)x^T}{t_2\left(\sum q_{k_w} + td_{k_w}\right)C_k)x^T} = \frac{tC_z x^T}{tC_w x^T}, \quad (13)$$

Where the 4×3 matrix:

$$C_z = \sum \left( q_{k_z} \begin{bmatrix} & C_k & \\ 0 & 0 & 0 \\ & \overline{C_k} & \end{bmatrix} + d_{k_z} \begin{bmatrix} 0 & 0 & 0 \\ & C_k & \\ & \overline{C_k} & \end{bmatrix} \right), \quad (14)$$

and the 4×3 matrix $C_w$ is defined correspondingly. We now have the depth function on a convenient form, but the number of coefficients needed is no less than directly storing the vertex positions. We will now examine the contents of the coefficient matrixes, $C_z$ and $C_w$, in order to simplify their expressions.

Using equation 14 and the definition of $C_k$, we can express the first and last row of $C_w$ as:

$$C_{w_0} = \Sigma q_{k_w} h_k = \Sigma q_{k_w} q_i \times q_j = (0, 0, \det(q_k, q_i, q_j)),$$

$$C_{w_3} = \Sigma d_{k_w} f_k = \Sigma d_{k_w} d_i \times d_j = (0, 0, \det(d_k, d_i, d_j)), \quad (15)$$

where, in the last step, the terms cancel out to zero for the x and y-components. The two remaining rows look a bit more complex, but with a similar derivation and simplification, we obtain:

$$C_{w_1} = \sum q_{k_w} g_k + d_{k_w} h_k$$
$$= \sum q_{k_w}(d_i \times q_j + q_i \times d_j) + d_{k_w}(q_i \times q_j)$$
$$= \left(0, 0, \sum \det(d_k, q_i, q_j)\right),$$

$$C_{w_2} = \sum q_{k_w} f_k + d_{k_w} g_k = \left(0, 0, \sum \det(q_k, d_i, d_j)\right).$$

Using these expressions, we can formulate $tC_w x^T$ as a quadratic function in t independent of $(x, y)$:

$$tC_w x^T = \Delta_0 + \Delta_1 t + \Delta_2 t^2 + \Delta_3 t^3, \quad (16)$$

where:
$\Delta_0 = \det(q_k, q_i, q_j)$,
$\Delta_1 = \Sigma \det(d_k, q_i, q_j)$
$\Delta_2 = \Sigma \det(q_k, d_i, d_j)$
$\Delta_3 = \det(d_k, d_i, d_j)$.

Expressed differently, the denominator $tC_w x^T$ is the backface status for the moving triangle, e.g., $\det(p_o(t), p_1(t), p_2(t))$, which is independent of $(x, y)$.

As a result of these simplifications, we reveal that $tC_w x^T$ has no dependency on x and y and is reduced to a cubic polynomial in t, needing only 4 coefficients. Thus, with this analysis, we have shown that the depth function can be represented by 12 (for $C_z$) + 4 (for $C_w$) = 16 coefficients, which should be compared to the 24 coefficients needed to store all vertex positions. This formulation is substantially more compact.

If we use a standard projection matrix, according to Equation 4, we can simplify the depth function further. If we return to Equation 14, and insert the constraint from the projection matrix, i.e., $q_z = aq_w + b$ and $d_z = z_{t_1} - z_{t_1} = ad_w$, we obtain:

$$C_z = \Sigma(q_{k_z} \overline{C_k} + d_{k_z} \underline{C_k}) = \Sigma((aq_{k_w} + b)\overline{C_k} + ad_{k_w} \underline{C_k}) = aC_w + b\Sigma \begin{bmatrix} \overline{C_k} \end{bmatrix}. \quad (17)$$

We combine this result with Equation 13 to finally arrive at:

$$d(x, y, t) = \frac{tC_z x^T}{tC_w x^T} = \frac{t\left(aC_w + b\sum \overline{C_k}\right)x^T}{tC_w x^T} = \quad (18)$$

$$a + b\frac{t\left(\sum \overline{C_k}\right)x^T}{tC_w x^T} = a + b\frac{t_2\left(\sum C_k\right)x^T}{\Delta_0 + \Delta_1 t + \Delta_2 t^2 + \Delta_3 t^3}$$

As can be seen above, we have reduced the representation of the depth function from 24 scalar values down to 13 (with the assumption that a and b are given by the graphics application program interface (API)).

Next, we consider an extra optimization for the special case of all three triangle vertices with a common motion vector, e.g., pure translation. In the examples below, we assume that a standard projection matrix is used (i.e., Equation 4). The transformed clip space position, $p' = (p_x', p_y', p_w')$, of each triangle vertex is: $p' = p + d$, where $d = (d_x, d_y, d_w)$ is a vector in clip space (xyw).

With all motion vectors equal for the three vertices of a triangle, we can derive a simplified depth function. Note that the coefficients $f_k = 0$, and
$\det(d_i, d_j, d_k) = \det(d, d, d) = 0$
$\det(q_i, d_j, d_k) = \det(q_i, d, d) = 0$.
Furthermore, it holds that:

$$\Sigma g_k = \Sigma d \times (q_j - q_i) = d \times \Sigma(q_j - q_i) = 0. \quad (19)$$

The depth function can then be simplified as:

$$d(x, y, t) = a + b\frac{x \cdot \sum h_k}{\Delta_0 + \Delta_1 t} \quad (20)$$

We have reduced the representation of the depth function from 18 scalar values down to 5 (again with the assumption that a and b are given by the graphics API).

There are not as many opportunities to simplify the depth function for defocus blur as there are for motion blur. If we simply store all vertex positions, then 4×3=12 coordinate values are needed. If, however, the projection matrix is known, the number is reduced to 3×3=9. We assume that the camera focal distance and lens aspect are known globally. In the following section, we will show how to reduce the storage requirement of the depth function to 8 scalar coefficients for a defocused triangle.

When depth of field is enabled, a clip-space vertex position is sheared in xy as a function of the lens coordinates $(u, v)$. The vertex position is expressed as:

$$p = q + cu', \quad (21)$$

where c is the signed clip space circle of confusion radius, $u' = (u, \xi u, 0)$, and $\xi$ is a scalar coefficient that adjusts the lens aspect ratio. We use these vertices to set up the edge equations:

$$e_k(x, y, u, v) = (p_i(u, v) \times p_j(u, v)) \cdot x$$
$$= (q_i \times q_j + u' \times (c_i q_j - c_j q_i)) \cdot x$$
$$= (h_k + u' \times m_k) \cdot x,$$

where we have introduced $m_k = (c_i q_j - c_j q_i)$ and $h_k = q_i \times q_j$ to simplify notation. With $u = (u, kv, 1)$, we can write the edge equation on matrix form as:

$$e_k(x, y, u, v) = uC_k x^T, \quad (22)$$

where:

$$C_k = \begin{bmatrix} 0 & -m_{k_w} & m_{k_y} \\ m_{k_w} & 0 & -m_{k_x} \\ h_{k_x} & h_{k_y} & h_{k_w} \end{bmatrix} \quad (23)$$

Analogous to the motion blur case, we can express the depth function as a rational function in (x, y, u, v) as follows:

$$d(x, y, u, v) = \frac{z(x, y, u, v)}{w(x, y, u, v)} = \frac{uC_z x^T}{uC_w x^T}, \quad (24)$$

where $C_z = \Sigma q_{k_z} C_k$ and $C_w = \Sigma q_{k_w} C_k$. By combining the observation that:

$$\Sigma q_{k_w} m_{k_w} = \Sigma q_{k_w}(c_i q_{j_w} - c_j q_{i_w}) = 0, \quad (25)$$

and the top row in Equation 15, $C_w$ is reduced to a single column, similar to the motion blur case. Thus, the denominator can be written as:

$$uC_w x^T = \begin{bmatrix} 0 & 0 & \sum q_{k_w} m_{k_w} u \\ 0 & 0 & -\sum q_{k_w} m_{k_x} \xi v \\ 0 & 0 & \det(q_0, q_1, q_2) \end{bmatrix} x^T = \Delta_u u + \Delta_v v + \Delta_0, \quad (26)$$

Again, this is equal to $\det(p_0(u, v), p_1(u, v), p_2(u, v))$, which is also the backface status for a defocused triangle.

If we introduce the restrictions on the projection matrix as in Equation 4, then $C_z$ can be expressed in the following manner:

$$C_z = \Sigma q_{k_z} C_k = \Sigma (aq_{k_w} + b) C_k = aC_w + b\Sigma C_k. \quad (27)$$

If we further assume that the clip-space circle of confusion radius follows the lens model, it can be written as $c_k = \alpha p_{k_w} + \beta$. With this, we see that:

$$\sum m_{k_w} = \sum (c_i p_{j_w} - c_j p_{i_w})$$
$$= \sum ((\alpha p_{i_w} + \beta) p_{j_w} - (\alpha p_{j_w} + \beta) p_{i_w})$$
$$= \alpha \sum (p_{i_w} p_{j_w} - p_{j_w} p_{i_w}) + \beta \sum (p_{j_w} - p_{i_w}) = 0,$$

and $\Sigma C_k$ takes the form:

$$\sum C_k = \begin{bmatrix} 0 & 0 & \sum m_{k_y} \\ 0 & 0 & -\sum m_{k_x} \\ \sum h_{k_x} & \sum h_{k_y} & \sum h_{k_w} \end{bmatrix} \quad (28)$$

With this, we have shown that:

$$d(x, y, u, v) = \frac{uC_z x^T}{uC_w x^T} = a + b \frac{\sum h_k \cdot x + \sum m_{k_y} u - \sum m_{k_x} \xi v}{\Delta_u u + \Delta_v v + \Delta_0} \quad (29)$$

which can be represented with 8 scalar coefficients (given that a and b are known). The denominator is linear in each variable.

The algorithms may be implemented in a software or hardware rasterizer augmented with a depth system containing depth codecs (compressors and decompressors), a depth cache, culling data, and a tile table. To reduce the design space, we chose a cache line size of 512 bits, i.e., 64 bytes, which is a reasonable and realistic size for our purposes. The implication of this choice is that a tile, which is stored using 512·n bits, can be compressed down to 512·m bits, where $1 \leq m < n$ in order to gain bandwidth usage. It should be noted that any practical cache line size can be used, and 512 bits is just used as an example.

Thus in some embodiments, a graphics pipeline 10 shown in FIG. 1 may include at least a rasterizer 12 which may be software or hardware based. It provides depth function coefficients to a compressor 14. The compressor 14 gets depth data from a depth cache 16 and tile information from the tile table 18. The compressor 14 and rasterizer 12 may be controlled by a control 11 in some embodiments. The control may be a processor or controller as examples.

Figure 3:
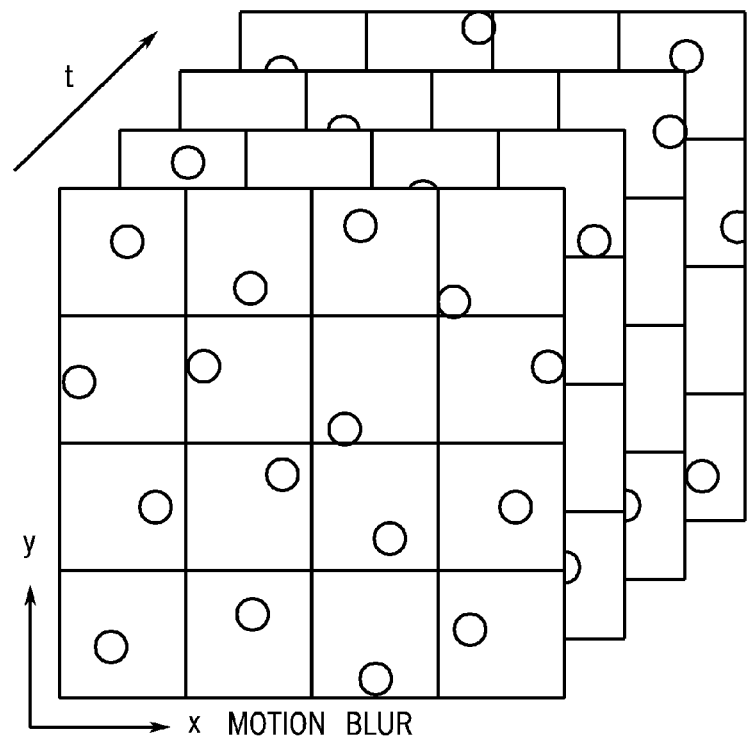
FIG. 3 is a depiction of motion blur for 4×4 pixels with four samples per pixel indicated by four layers.

Even though motion blur is three-dimensional, and defocus blur uses four dimensions, the same tile notation may be used for both these cases in order to simplify the discussion. An explanation of our notation can be found in FIGS. 3 and 4. In FIG. 3, motion blur for 4×4 pixels is shown where there are four samples per pixel indicated by the four different layers. In total, there are 4×4×4 samples. If n layers are used as the tile size for compression, then we denote such a tile as 4×4×n. As an example, if each layer is compressed as a separate tile, then we denote these tiles by 4×4×1.

Figure 4:
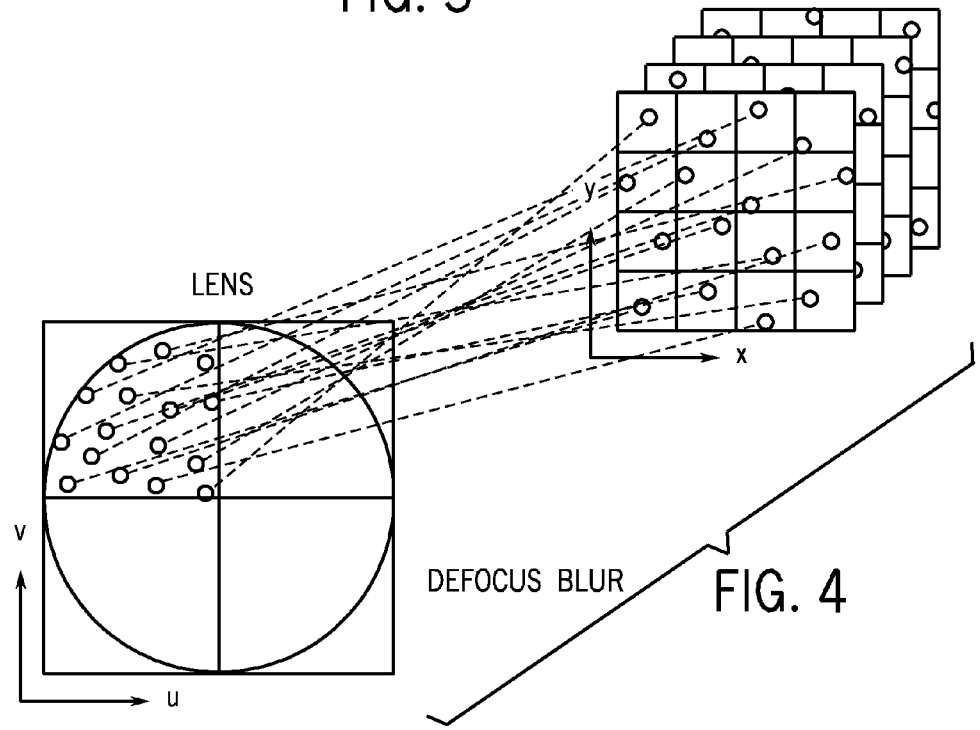
FIG. 4 is a depiction for defocus blur.

In FIG. 4, the same notation is used for defocus blur, but with a different meaning. Here, the lens has been divided into 2×2 smaller lens regions, and as before, there are four samples per pixel. Again, indicated by the four layers. However, for defocus blur, 4×4×n means that n layers regions are compressed together as a tile.

Figure 2:
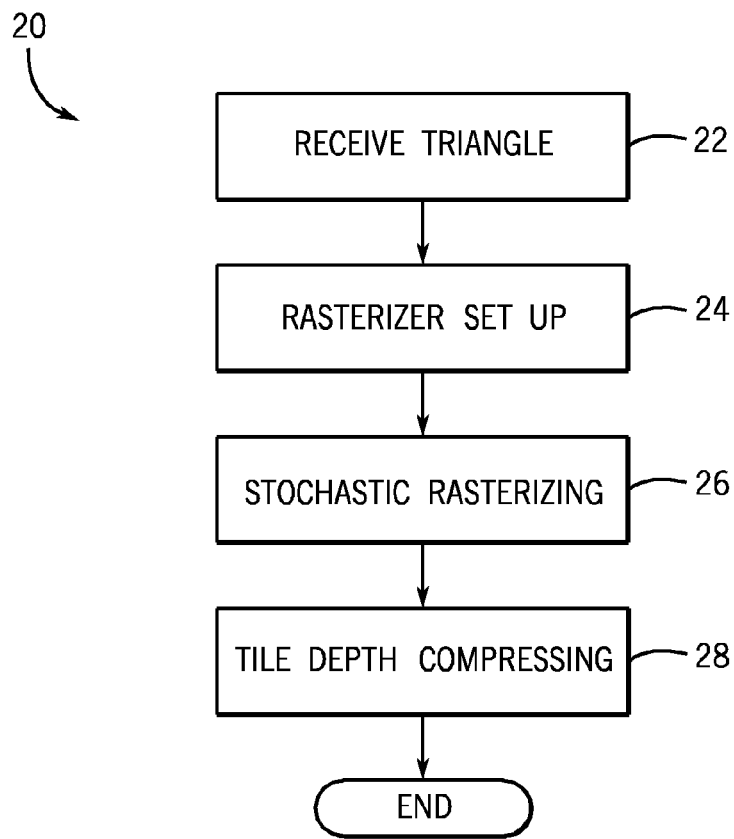
FIG. 2 is a flow chart for a sequence according to one embodiment.

Referring to FIG. 2, the sequence 20 may be implemented in software, firmware and/or hardware. In software and firmware embodiments, it may be implemented by computer executed instructions stored in one or more non-transitory computer readable media such as magnetic, optical or semiconductor storages. For example the control shown in FIG. 1 may be used for this purpose in some embodiments.

The sequence 20 begins by providing a triangle to a rasterizer as indicated at block 22. The rasterizer set-up computes depth function coefficients which are passed directly to the tile depth compressor, as indicated in block 24. The stochastic rasterizer computes, for each tile, per sample coverage in depth, as indicated at block 26. Then the tile depth compressor takes coverage mask, per sample depth and depth function coefficients as inputs. If the sample depths can be represented by a depth function, the tile is stored in a compressed form as indicated in block 28.

For culling per 8×8×1 tiles, we store $z_{min}$ and $z_{max}$ of the tile using 30 bits each in order to do Z-max culling and Z-min culling. In addition to the min and max values, we also allocated one bit per group of 16 samples, or one cache line worth of uncompressed samples, to indicate whether all of them are cleared. This sums to 4 clear bits per 8×8×1 tile, and so, 64 bits are needed in total per 8×8×1 tile for culling and clear bits.

The tile table, which is accessed through a small cache or stored in an on-chip memory, stores a tile header for each tile. In one embodiment, the tile header may store four bits, where one combination (0000b) indicates that the tile is stored uncompressed, while the remaining 15 combinations are used to indicate different compression modes. These four bits may use a different tile size compared to the culling tile size because the algorithms usually perform quite differently depending on which tile size is used. For example, for depth offset compression algorithms, a smaller tile size is usually advantageous, while larger tile sizes may be better for generalized plane encoding (GPE), which is the method presented in this patent application.

One implementation of the generalized plane encoder is as follows. For the motion blur encoder, we let the rasterizer forward information about the type of motion applied to each triangle. The three different types of motion that we support are static (no motion), only translation, and arbitrary linear per-vertex motion. In addition, the rasterizer forwards a coverage mask, which indicates which sample positions are inside the triangle. The depth is evaluated for these samples, and depth testing is performed. The depth functions of any previously drawn triangles are removed if their sample indices are covered by the incoming triangle's coverage mask. The depth of field encoder works in exactly the same way, except that there are no special types for defocus blur that are forwarded. It should be noted that our method also works for motion blur and depth of field at the same time. However, in this case, the most compact representation is simply to store (x,y,w) per vertex at both time 0 and time 1 for all three vertices of a triangle. While the representation is not optimized, the algorithm works and provides the same advantages as described above.

A new triangle can be added to the compressed representation as follows. A triangle may be rasterized to each covered tile on screen to obtain its per-sample coverage and depth values. Within each tile, the depth test is performed by decompressing the compact representation (to obtain the stored depth values for each covered sample). If any sample passes the depth test, the compressed representation is updated by adding the depth function coefficient for the current triangle and update the bitmask. If no sample passes the depth test, the current compressed representation and bitmask is not updated.

Below, we discuss the case of depth functions for the case of simultaneous motion blur and depth of field. In contrast to the case of only motion blur or only depth of field, the number of coefficients to store the depth function as a function of (x, y, u, v, t) is larger than simply storing the three triangle vertices as t=0 and t=1. Therefore, we do not explicitly derive and simplify the depth function on this form, but work with the vertex data directly.

One way of representing the depth function for the case of simultaneous motion blur and depth of field is to simply store the three triangle vertices at t=0, denoted $q_i$, and t=1, denoted $r_i$. When visiting a tile, the depth value for a given sample can then be obtained from this data by:
1. First evaluate the vertex positions for the sample's (u, v, t) position, e.g., $p_i(u,v,t)=(1-t)q_i+tr_i+c_i(t)(u, \xi v, 0)$
2. Use these vertex positions to derive a static depth plane equation on the form d(x,y)=Ax+By+C
3. Evaluate the depth plane equation for the sample's (x, y) position The storage cost for this depth function representation is 2×3×4=24 scalar values, which can be reduced to 2×3×3=18 scalar values if the z-mapping of the projection matrix is known, i.e., $z_{clip}=az_{cam}+b$, $w_{clip}=z_{cam}$. As previously shown, if we derive and simplify the depth function for the case of simultaneous motion blur and depth of field, is can be represented with 25 scalar values, which is more expensive in terms of storage.

Figure 5:
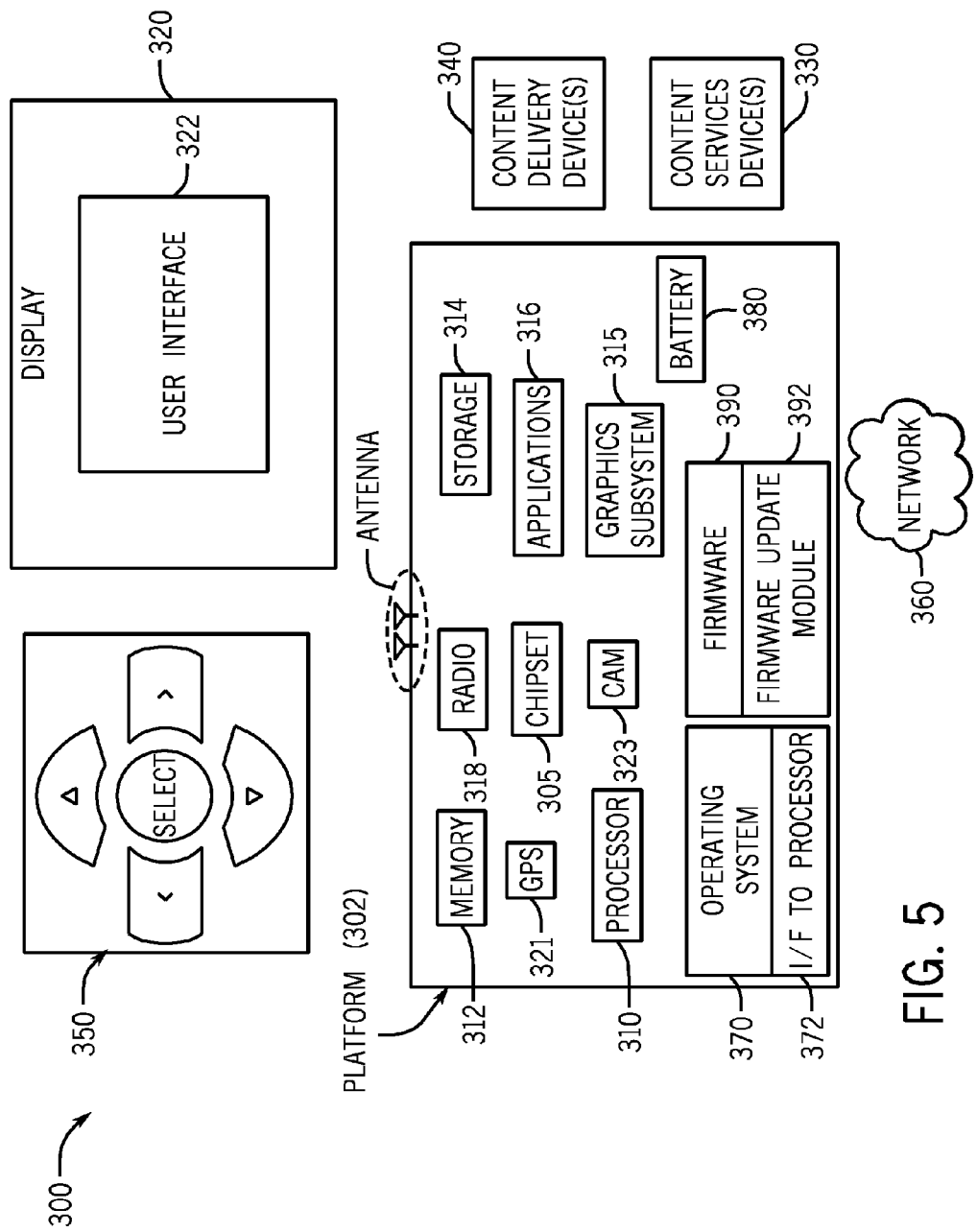
FIG. 5 is a system depiction of one embodiment.

FIG. 5 illustrates an embodiment of a system 300. In embodiments, system 300 may be a media system although system 300 is not limited to this context. For example, system 300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 300 comprises a platform 302 coupled to a display 320. Platform 302 may receive content from a content device such as content services device(s) 330 or content delivery device(s) 340 or other similar content sources. A navigation controller 350 comprising one or more navigation features may be used to interact with, for example, platform 302 and/or display 320. Each of these components is described in more detail below.

In embodiments, platform 302 may comprise any combination of a chipset 305, processor 310, memory 312, storage 314, graphics subsystem 315, applications 316 and/or radio 318. Chipset 305 may provide intercommunication among processor 310, memory 312, storage 314, graphics subsystem 315, applications 316 and/or radio 318. For example, chipset 305 may include a storage adapter (not depicted) capable of providing intercommunication with storage 314.

Processor 310 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 310 may comprise dual-core processor(s), dual-core mobile processor(s), and so forth.

Memory 312 may be implemented as a volatile memory device such as, but not limited to, a Random Access Memory (RAM), Dynamic Random Access Memory (DRAM), or Static RAM (SRAM).

Storage 314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 314 may comprise technology to increase the storage performance enhanced protection for valuable digital media when multiple hard drives are included, for example.

Graphics subsystem 315 may perform processing of images such as still or video for display. Graphics subsystem 315 may be a graphics processing unit (GPU) or a visual processing unit (VPU), for example. An analog or digital interface may be used to communicatively couple graphics subsystem 315 and display 320. For example, the interface may be any of a High-Definition Multimedia Interface, DisplayPort, wireless HDMI, and/or wireless HD compliant techniques. Graphics subsystem 315 could be integrated into processor 310 or chipset 305. Graphics subsystem 315 could be a stand-alone card communicatively coupled to chipset 305.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 318 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 318 may operate in accordance with one or more applicable standards in any version.

In embodiments, display 320 may comprise any television type monitor or display. Display 320 may comprise, for example, a computer display screen, touch screen display, video monitor, television-like device, and/or a television. Display 320 may be digital and/or analog. In embodiments, display 320 may be a holographic display. Also, display 320 may be a transparent surface that may receive a visual projection. Such projections may convey various forms of information, images, and/or objects. For example, such projections may be a visual overlay for a mobile augmented reality (MAR) application. Under the control of one or more software applications 316, platform 302 may display user interface 322 on display 320.

In embodiments, content services device(s) 330 may be hosted by any national, international and/or independent service and thus accessible to platform 302 via the Internet, for example. Content services device(s) 330 may be coupled to platform 302 and/or to display 320. Platform 302 and/or content services device(s) 330 may be coupled to a network 360 to communicate (e.g., send and/or receive) media information to and from network 360. Content delivery device(s) 340 also may be coupled to platform 302 and/or to display 320.

In embodiments, content services device(s) 330 may comprise a cable television box, personal computer, network, telephone, Internet enabled devices or appliance capable of delivering digital information and/or content, and any other similar device capable of unidirectionally or bidirectionally communicating content between content providers and platform 302 and/display 320, via network 360 or directly. It will be appreciated that the content may be communicated unidirectionally and/or bidirectionally to and from any one of the components in system 300 and a content provider via network 360. Examples of content may include any media information including, for example, video, music, medical and gaming information, and so forth.

Content services device(s) 330 receives content such as cable television programming including media information, digital information, and/or other content. Examples of content providers may include any cable or satellite television or radio or Internet content providers. The provided examples are not meant to limit embodiments of the invention.

In embodiments, platform 302 may receive control signals from navigation controller 350 having one or more navigation features. The navigation features of controller 350 may be used to interact with user interface 322, for example. In embodiments, navigation controller 350 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 350 may be echoed on a display (e.g., display 320) by movements of a pointer, cursor, focus ring, or other visual indicators displayed on the display. For example, under the control of software applications 316, the navigation features located on navigation controller 350 may be mapped to virtual navigation features displayed on user interface 322, for example. In embodiments, controller 350 may not be a separate component but integrated into platform 302 and/or display 320. Embodiments, however, are not limited to the elements or in the context shown or described herein.

In embodiments, drivers (not shown) may comprise technology to enable users to instantly turn on and off platform 302 like a television with the touch of a button after initial boot-up, when enabled, for example. Program logic may allow platform 302 to stream content to media adaptors or other content services device(s) 330 or content delivery device(s) 340 when the platform is turned "off." In addition, chip set 305 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 300 may be integrated. For example, platform 302 and content services device(s) 330 may be integrated, or platform 302 and content delivery device(s) 340 may be integrated, or platform 302, content services device(s) 330, and content delivery device(s) 340 may be integrated, for example. In various embodiments, platform 302 and display 320 may be an integrated unit. Display 320 and content service device(s) 330 may be integrated, or display 320 and content delivery device(s) 340 may be integrated, for example. These examples are not meant to limit the invention.

In various embodiments, system 300 may be implemented as a wireless system, a wired system, or a combination of both. When implemented as a wireless system, system 300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
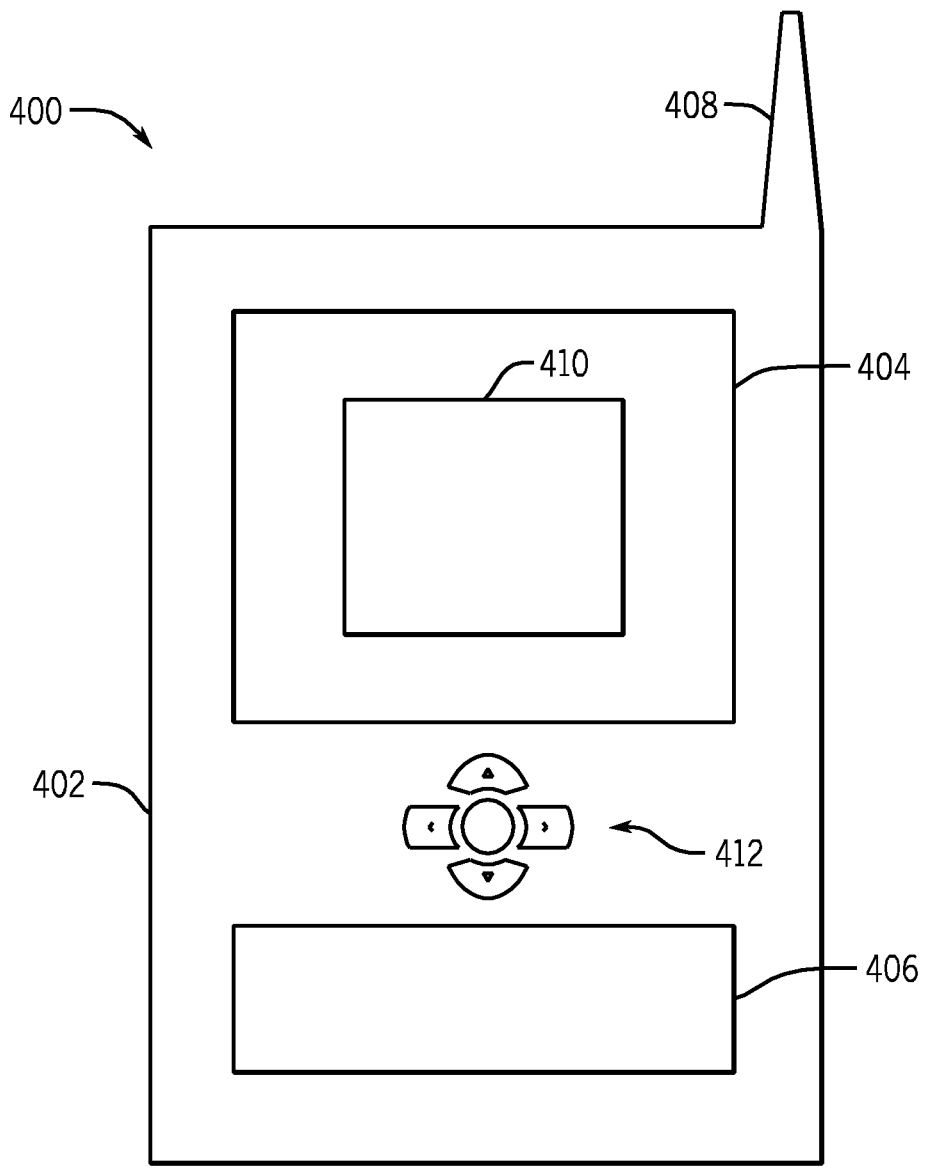
FIG. 6 is a front elevation view of one embodiment.

As described above, system 300 may be embodied in varying physical styles or form factors. FIG. 6 illustrates embodiments of a small form factor device 400 in which system 300 may be embodied. In embodiments, for example, device 400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 310 may communicate with a camera 322 and a global positioning system sensor 320, in some embodiments. A memory 312, coupled to the processor 310, may store computer readable instructions for implementing the sequences shown in FIGS. 1 and 2 in software and/or firmware embodiments. Particularly the sequences may be implemented by one or more non-transitory storage devices storing computer implemented instructions.

As shown in FIG. 6, device 400 may comprise a housing 402, a display 404, an input/output (I/O) device 406, and an antenna 408. Device 400 also may comprise navigation features 412. Display 404 may comprise any suitable display unit for displaying information appropriate for a mobile computing device. I/O device 406 may comprise any suitable I/O device for entering information into a mobile computing device. Examples for I/O device 406 may include an alphanumeric keyboard, a numeric keypad, a touch pad, input keys, buttons, switches, rocker switches, microphones, speakers, voice recognition device and software, and so forth. Information also may be entered into device 400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer executed method comprising:
computing, using a hardware processor depth function coefficients for triangles undergoing at least one of motion blur or depth of field;
for each of a plurality of tiles computing, using a hardware processor, per sample coverage; and
using the per sample coverage in a hardware tile depth compressor to store compressed depths for samples of a tile.

2. The method of claim 1 including computing using a rasterizer.

3. The method of claim 2 including computing using a software rasterizer.

4. The method of claim 2 including preparing a representation of a depth function directly from a rasterizer set-up.

5. The method of claim 2 including forwarding information about motion type from the rasterizer to the compressor.

6. The method of claim 1 including representing a depth function with only 16 coefficients for motion blur.

7. The method of claim 1 including representing a depth function with only 13 coefficients for depth of field.

8. The method of claim 1 including reducing the number of depth function coefficients using a projection matrix.

9. The method of claim 1 including storing a tile header in a tile table indicating a compression mode.

10. The method of claim 1 including adding a triangle to a compressed representation by rasterizing the triangle to each covered tile to obtain its per sample coverage and depth values, performing a depth test within each tile and if any sample passes the depth test, updating the compressed representation.

11. The method of claim 1 including reducing the number of depth function coefficients.

12. One or more non-transitory computer readable media storing instructions to perform a sequence comprising:
  computing depth function coefficients for triangles undergoing at least one of motion blur or depth of field;
  for each of a plurality of tiles computing per sample coverage; and
  using the per sample coverage in a tile depth compressor to store compressed depths for samples of a tile.

13. The media of claim 12 said sequence further including computing using a rasterizer.

14. The media of claim 13 said sequence further including computing using a software rasterizer.

15. The media of claim 13 said sequence further including preparing a representation of a depth function directly from a rasterizer set-up.

16. The media of claim 13 said sequence further including forwarding information about motion type from the rasterizer to the compressor.

17. The media of claim 12 said sequence further including representing a depth function with only 16 coefficients for motion blur.

18. The media of claim 12 said sequence further including representing a depth function with only 13 coefficients for depth of field.

19. The media of claim 12 said sequence further including reducing the number of depth function coefficients using a projection matrix.

20. The media of claim 12 said sequence further including storing a tile header in a tile table indicating a compression mode.

21. The media of claim 12, said sequence further including reducing the number of depth function coefficients.

22. An apparatus comprising:
  a control to compute depth function coefficients for triangles undergoing at least one of motion blur or depth of field, compute per sample coverage for each of a plurality of tiles, and use the per sample coverage in a tile depth compressor to store compressed depths for samples of a tile;
  a rasterizer coupled to said control; and
  a compressor coupled to said control.

23. The apparatus of claim 22 wherein said rasterizer is a software rasterizer.

24. The apparatus of claim 22, said control to prepare a representation of a depth function directly from a rasterizer set-up.

25. The apparatus of claim 22, said rasterizer to represent a depth function with only 16 coefficients for motion blur.

26. The apparatus of claim 22, said rasterizer to represent a depth function with only 13 coefficients for depth of field.

27. The apparatus of claim 22, said rasterizer to reduce the number of depth function coefficients using a projection matrix.

28. The apparatus of claim 22, said control to store a tile header in a tile table indicating a compression mode.

29. The apparatus of claim 22, said rasterizer to reduce the number of depth function coefficients.

30. A method comprising:
  for each of a plurality of tiles, for an overlapping triangle undergoing motion blur and depth of field, using a hardware processor to store the triangle vertex positions representing the triangle at two different times; and
  using these vertex positions to compute per sample coverage in a hardware tile depth compressor to store compressed depths for samples of a tile.

* * * * *